June 7, 1966 H. HAUS 3,254,586

EXPOSURE APPARATUS

Filed Sept. 13, 1963 4 Sheets-Sheet 1

HANS HAUS
INVENTOR.

BY [signature]

June 7, 1966 H. HAUS 3,254,586

EXPOSURE APPARATUS

Filed Sept. 13, 1963 4 Sheets-Sheet 2

HANS HAUS
INVENTOR.

BY

[signature]

June 7, 1966 H. HAUS 3,254,586

EXPOSURE APPARATUS

Filed Sept. 13, 1963 4 Sheets-Sheet 3

HANS HAUS
INVENTOR.

BY

EXPOSURE APPARATUS

Filed Sept. 13, 1963

HANS HAUS
INVENTOR.

BY
Manus S. Blodgett 3,254,586

EXPOSURE APPARATUS

Hans Haus, Am Stephanshugel 10, Limburg, Germany

Filed Sept. 13, 1963, Ser. No. 308,877
Claims priority, application Germany, Apr. 27, 1963, H 48,991, H 44,991
1 Claim. (Cl. 95—73)

Figure 1:
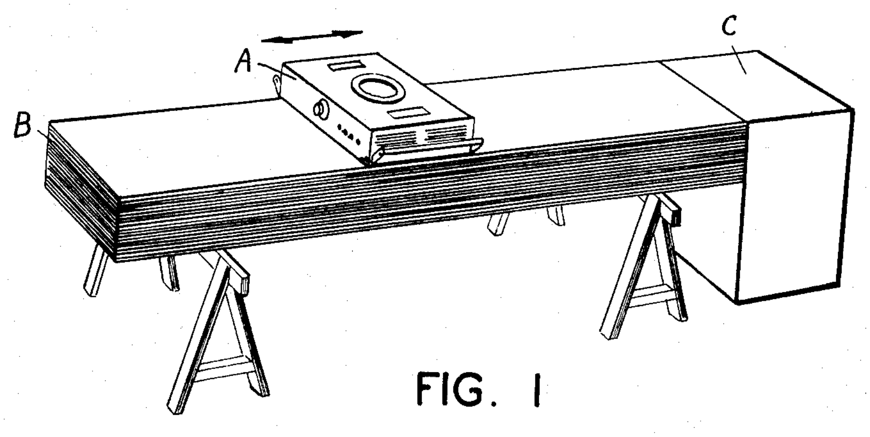

This invention relates to an exposure apparatus and, more particularly, to apparatus arranged to provide light for the actuation of photosensitive materials.

In the printing of large photosensitive sheets, such as blueprints, it is common practice to lay the sheet out on a large flat surface with the drawing (which has been made on transparent or translucent material) overlying the blueprint paper. Then, a light source is moved in a regular manner over the top of the drawing, thus exposing the photosensitive material which is then developed. These light sources in the past have sometimes taken the form of movable vehicles which are rolled by hand over the papers to be copied; the movement of the light source takes place by hand, the hand regulating the amount of pressure, the speed of the drive, and the guiding of the vehicle. The guiding of the vehicle by hand in a regular manner is particularly difficult, so that it has been common practice to provide tracks for the vehicle to move along. This means that, when one uses a large pile of the photosensitive sheets, printing one after another, it is necessary to adjust the guide tracks after a few exposures, otherwise, the amount of light to which the sheets will be exposed gradually decreases. Furthermore, these devices are extremely complicated and expensive and difficult to regulate properly. These and other difficulties experienced with the prior art devices have been obviated in a novel manner by the present invention.

It is, therefore, an outstanding object of the invention to provide an exposure apparatus which is entirely independent of guide tracks and the like and is supported solely on the surface of the material to be exposed.

Another object of this invention is the provision of an exposure apparatus wherein the apparatus is independently driven and is used without guide tracks but in which, nevertheless, the deviation from straight-line movement over considerable lengths is negligible in amount.

A further object of the present invention is the provision of an exposure apparatus which requires no adjustment after each exposure.

It is another object of the instant invention to provide an exposure apparatus in which the light source is arranged in such a way as to give even exposure to various parts of the material over which the apparatus passes.

It is a further object of the invention to provide an illumination apparatus in which for a given size of light source extremely high intensity of radiation is obtained, so that exposure of photosensitive materials may take place at a faster rate.

A still further object of this invention is the provision of an exposure apparatus in which the disadvantage of stripes and uneven exposure on the copy sheets is not experienced.

It is a still further object of the present invention to provide an exposure apparatus which is simple in construction, which is inexpensive to manufacture, which can be operated by relatively unskilled labor, and which is capable of a long life of useful service with a minimum of maintenance.

With these and other objects in view, as will be apparent to those skilled in the art, the invention resides in the combination of parts set forth in the specification and covered by the claims appended hereto.

Figures 2, 2A:
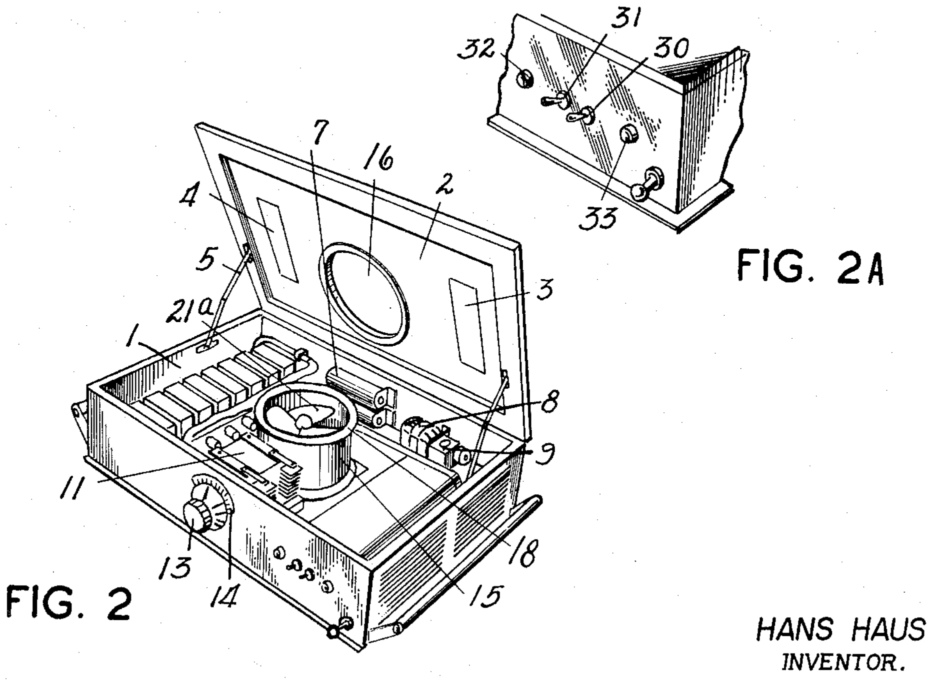
Figure 3:
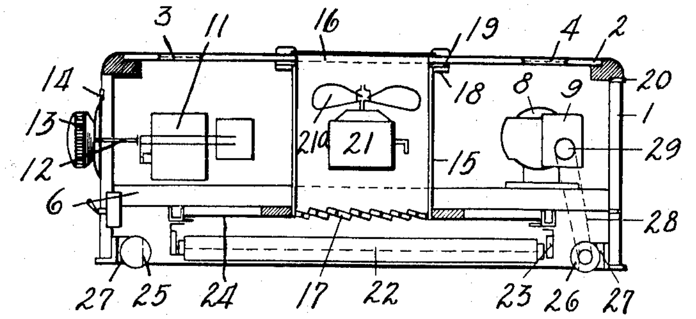
Figure 4:
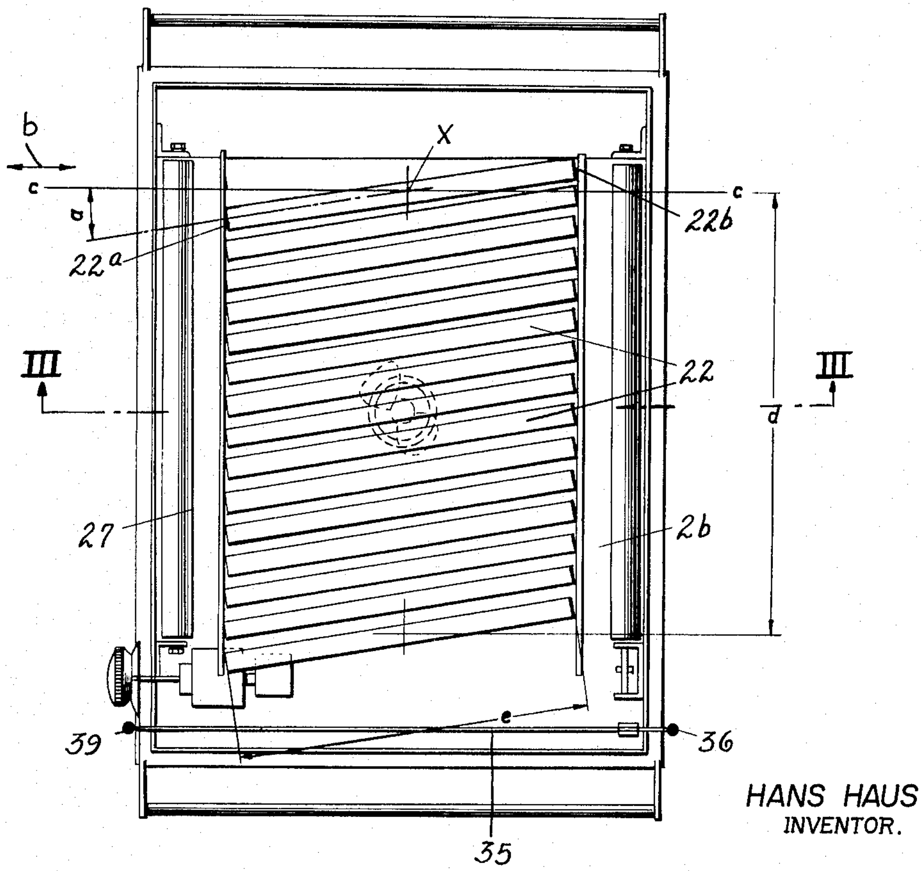
Figure 5:
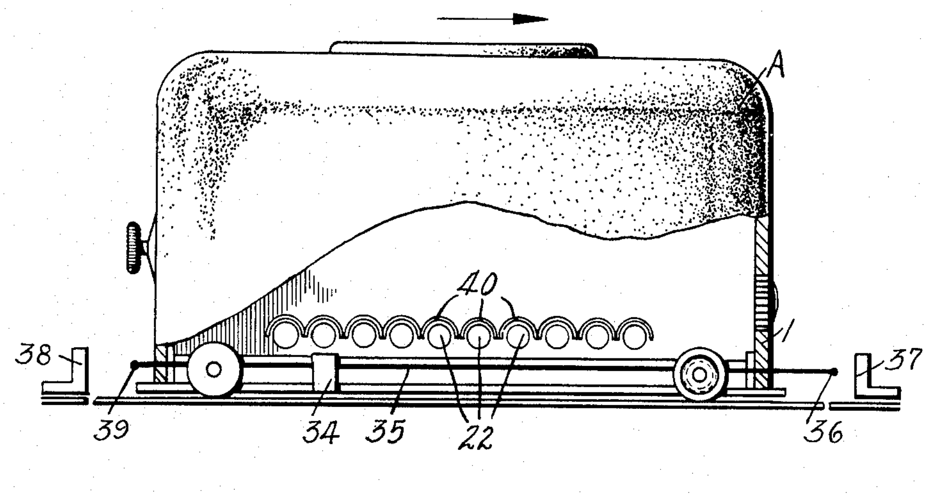
Figure 6:
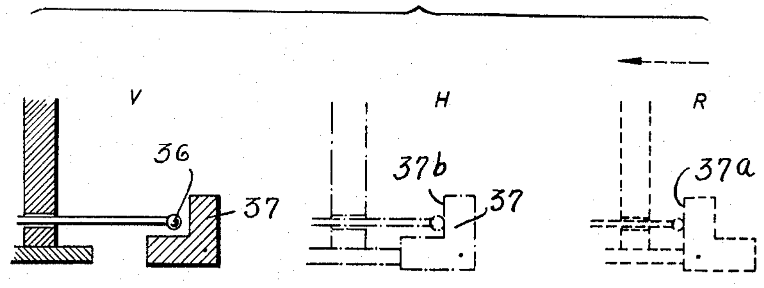
Figure 7:
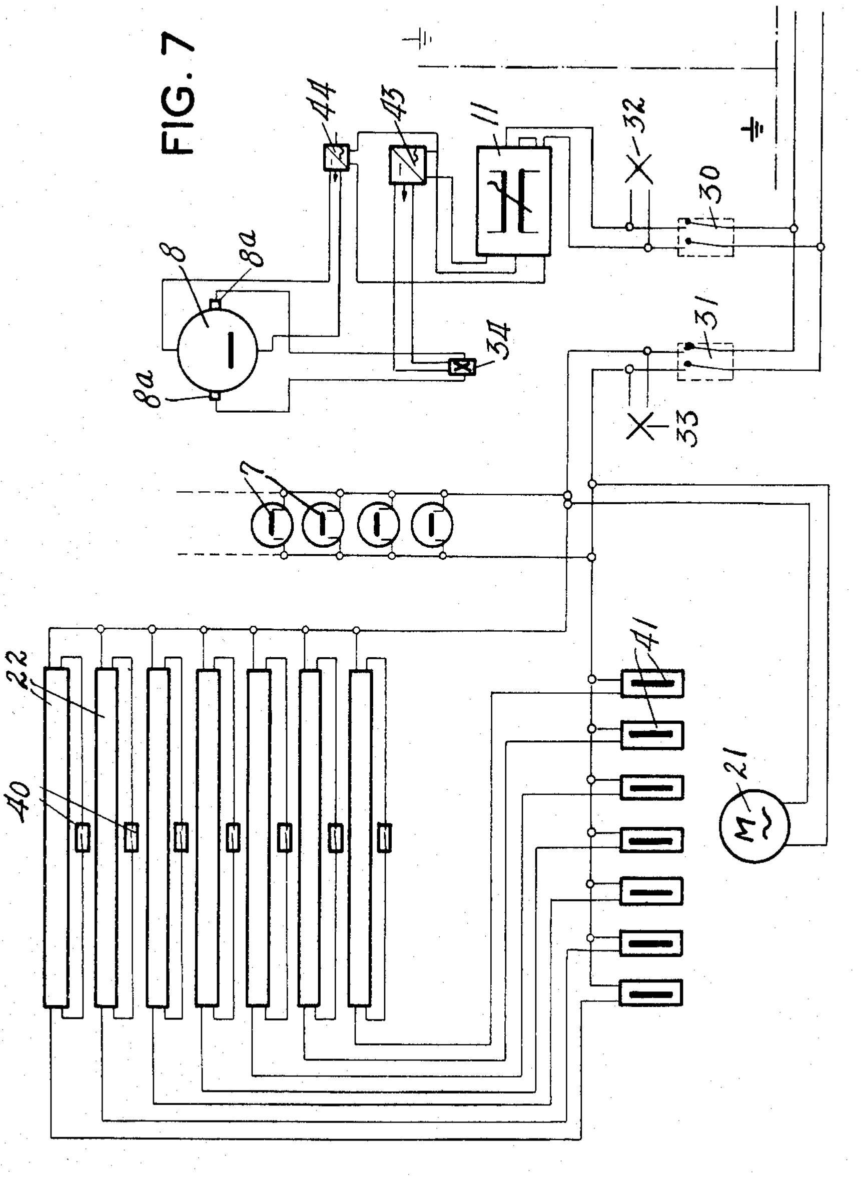

The character of the invention, however, may be best understood by reference to one of its structural forms, as illustrated by the accompanying drawings in which:

FIG. 1 is a perspective view of an exposure apparatus embodying the principles of the present invention, FIG. 2 is an enlarged perspective view of the apparatus in open condition, FIG. 2A is an enlarged view of a portion of the apparatus, FIG. 3 is a sectional view of the apparatus taken on the line III—III of FIG. 4, FIG. 4 is a bottom view of the invention, FIG. 5 shows a side view with sections broken away of another embodiment of the invention, FIG. 6 shows three positions of certain control elements in the apparatus, and FIG. 7 is a schematic view of the electrical circuitry in the apparatus.

Generally speaking, the present invention provides a motor-driven exposure apparatus in the form of a vehicle which is adapted to move steadily over a long copy table. The exposure vehicle is provided with pressure rolls located before and after the light source and located in the vehicle housing. With the help of these pressure rolls, a drawing on transparent material lying over photosensitive material on the copy table will be pressed tightly during exposure. Such pressure prevents separation of the drawing from the photosensitive material and, therefore, prevents blurred copies and blurred lines. With the use of the present invention, the material to be exposed acts as the support for the light source and also functions as the guiding device because the wheels of the vehicle are driven. The exposure apparatus, according to the present design, can be moved over copy tables without any side guiding devices for distances of up to 300 feet without leaving the drive path in appreciable amounts. Exposure of piled-up sheets of photosensitive material can take place one after another simply by placing the vehicle on the pile; each sheet after exposure can be taken from the pile so that the sheet which lies underneath it is immediately ready for printing without any additional work.

Furthermore, the exposure apparatus itself can always be used in the area where the photo-sensitive sheets are stored; the pile doesn't have to be carried to a separate working room, as has been necessary in the past, because of the fact that the light source in prior art devices could only work with a copy table having fixed guide tracks. It is important to have uniform illumination of the exposure area and to have a certain constant minimum of drive speed for the light source. On the other hand, the exposure vehicle can carry only a certain number of lamps because of space limitations. According to the invention, these light fluorescent tubes are arranged parallel to one another at fixed distances apart; the distance between the tubes is kept smaller than a tube radius. With the customary arrangement of fluorescent tubes where a single reflector is used, it has been necessary to place the photosensitive material a considerable distance away from the light source in order that the material may be at the focal point of the reflector. With the present invention, in spite of the fact that a number of tubes move over the same exposure area one after another, the same uniform exposure is experienced but with more intense lighting of the material to be copied. The light tubes are positioned side-by-side and are also equipped with reflectors in the form of half-cylindrical troughs (one for each tube) wherein the radius of each semi-circular reflector is approximately equal to the radius of the light tube. The reflectors are, for practical purposes, so arranged that the distance from the tube to the reflector is only a fraction of an inch.

In those cases where the width of the exposure area measured at right angles to the direction of movement of the exposure vehicle is greater than the length of the commonly-used fluorescent tubes, the tubes can be arranged at an angle to the direction of motion of the vehicle; this angle of inclination has to be at least big enough so that both ends of each tube are moved sideways as great a distance as the diameter of the tube. This arrangement prevents the forming of stripes and of uneven exposure on the photosensitive material which would be the case as it is with the prior art devices when the tubes are arranged with their axes parallel to the direction of motion of the vehicle. The tilted arrangement described above provides that the entire length of the copy area during the time when the exposure apparatus moves over the area is treated with the same amount of light at any point.

In the housing of the exposure apparatus above the tubes (which form a sort of grate) there are arranged air shutters and a fan for removing air from between the fluorescent tubes. Furthermore, the invention provides for the drive of the vehicle to take place through only one of the pressing rolls. In addition, there are arranged at the front and rear of the copy vehicle pressure switches which switch the drive directions by contact of the vehicle with buffer elements.

Referring first to FIG. 1, wherein are best shown the general features of the invention, the exposure apparatus, indicated generally by the reference numeral A, is shown in use with a pile B of photosensitive material, the pile being provided at the end with a platform C. The exposure apparatus A is placed on the pile B and moves, after having been made ready for operation, back and forth (in the direction indicated by the arrows) over the surface to be exposed without the necessity of providing a guiding or steering apparatus. When the apparatus has reached the end of the pile, it may be switched in the reverse direction by hand or it may be operated automatically by switch elements, as will be explained more fully hereinafter. The photosensitive material to be exposed is covered during exposure by a drawing which may be made on transparent or translucent material, such as drawing paper or drafting cloth. After the top sheet of photosensitive material has been exposed, the apparatus A may be removed so that the sheet immediately under it is then ready for exposure. Then the apparatus can be replaecd on the pile. The end of the pile is provided with the platform C which may be vertically adjustable (in a manner not indicated) to permit the apparatus to run off the pile onto the upper surface of the platform for removal of the top sheet of photosensitive material. The construction of this apparatus is not part of the present invention and is not shown in detail.

Referring now to FIGS. 2 and 3, the exposure apparatus consists of a box-like carrier frame 1 which is provided with a cover 2 mounted at one side of the box by means of hinges. The cover and the frame proper are provided with suitable ventilating screens 3 and 4. The cover 2 can be maintained in open condition by means of toggles 5. The inside of the box is provided with a partition floor 6 on which the starters 7 for the floors and tubes are located and where is located a motor 8 with a reducing gear 9. Also located on the partition floor 6 is a control transformer 11 which is operated by means of a shaft 12, extending through the front wall of the frame 1 and carrying on the outside a control knob 13. A calibrated scale 14 is arranged on the outside of the frame around the knob. Finally, the partition floor 6 carries a cylindrical sleeve 15 whose axis is perpendicular to the partition and which has a screen opening 16 overlying it on the cover 2. Underneath the cylindrical sleeve is an opening covered by a metal mesh 17 mounted under the partition floor 6. The end of the cylindrical sleeve 15 at the side adjacent the cover 2 is provided with a flange 18 having an elastic ring 19 which presses against the undersurface of the cover 2. Also built into the cylindrical sleeve 15 is a motor 21 and a fan **21*a*** driven by it.

Under the partition floor 6 are mounted the fluorescent tubes 22 in commercial-type sockets 23 between the floor 6 and the tubes is arranged a reflector 24. The drive rolls 25 and 26 are mounted in bearing blocks 27 which are mounted on the inside of the frame 1. The drive acts on only one drive roll 26 and this is accomplished by a chain drive 28 from a secondary drive 29 of the reducing gear 9 connected to the motor 8.

On the side wall of the frame 1 on which the knob 13 is mounted are arranged, as is evident in FIG. 2*a*, switching and control devices, including a switch 30 for turning the drive motor 8 on and off and a switch 31 for turning the fluorescent tubes 23 on and off, the switch 31 also turning the fan motor 21 on and off. A control light 32 shows by illumination that the equipment is ready for operation and the control light 33 also shows that the lights and the fan motor are in operation. The drive motor 8 is switched in different directions by a pusher switch 34. As indicated in FIG. 5, this switch will be operated by a connecting rod 35. The rod 35 is capable of shifting in the direction of movement of the apparatus A and is supported and guided in the walls of the frame 1; it carries on its ends push buttons 36 and 39.

Referring to FIGS. 5 and 6, the push buttons 36 and 39 on the connecting rod 35 cooperate with the pusher switch 34 and with two buffer elements 37 and 38 which are arranged at both ends of the runway formed by the pile B. The pusher switch 34 operates in three switch positions. In the mid-position H, the switch causes the motor 8 to be turned off, while the positions R and V bring about movement in one direction or other of the motor 8. As is evident in FIG. 6, the push button 36 can also take three positions corresponding to the switch positions, and these are designated also by H for stop, V for the forward moving, and R for the backward moving directions. In the case shown, the buffer element 37 is shown in the position V, and the push button 36, when it strikes the buffer element 37, will be brought by motion of the vehicle into the switch position R which is shown in dotted lines. The motor 8 will be switched to a reverse movement by this operation through the pusher switch 34 and the vehicle starts to move away from the buffer element 37 in the direction of the arrow. As soon as the vehicle reaches the buffer element 38 (arranged at the other end of the path), the procedure repeats itself because now the push button 39 is sent from position V into positions R and, therefore, the direction of cart motion is again reversed. Should the back-and-forth drive of the vehicle be terminated, then it is necessary to push the push buttons 36 or 39 in the manner shown in FIG. 6. The vehicle with the push button 36 runs onto the buffer element 37 D and puts the button into position H, as shown in dotted lines. In this position, the motor 8 is switched off by the push button 34. To put the cart again into operation the push button 36 or 39 has to be pressed in when in the position R and pulled out when in the position V.

In the version of the invention shown in FIG. 5, each of the fluorescent tubes 22 is provided with a reflector 40 in the form of a trough which is mounted a small distance above the tube and which has a radius about the same as the radius of the tube. The distance between the light tubes is made as little as possible and not larger than is necessary for proper venting and heat transmission. The hot air between the tubes 22 and the reflector will be removed by the suction of the fan **21*a* which is arranged above the tubes and the reflectors; the warm air is blown out through the screen 16 in the frame cover 2**. During this procedure, cold air will be drawn into the box from all sides by the suction created on the underside, especially through the open underportion of the frame 1 and through the light tubes which form a screen. The metal mesh 17 shown in FIG. 3 inside of the reflector 24 is formed of expanded metal and is provided with a reflecting surface. Practical experience with such a design where the expanded metal is provided with a polished surface is that no measurable difference in the amount of radiation is encountered.

Referring to FIG. 4, it can be seen that the tilted arrangement of the fluorescent tubes 22 is such that the width measured perpendicularly to the direction of movement of the vehicle of the exposure area is greater than the length of any one of the tubes. As shown, the tubes 22 are arranged at an angle "*a*" to the direction of movement of the apparatus A which direction is indicated by the double arrow "*b*". This angle is laid out so that the ends 22*a* and 22*b* of a tube lie a distance from the straight line *cc* (which goes through the center point of the tubes and parallel to the direction of motion of the vehicle) which is about the same as a tube diameter. In FIG. 4, the vertical width "*d*" can be chosen as large as desired without paying attention to the available light tubes.

In FIG. 7, which shows the electrical control apparatus, can be seen that the fluorescent tubes 22 are energized by the switch 31 by means of ignition coils 41. With the same switch, the fan motor 21 can be energized. The starters 7 are connected in parallel with the tubes 22 and also with the control lamp 33. Now, the switch 30 serves to operate the direct current drive motor 8 and this arrangement is operated as follows: the motor field coil gets its current from the transformer 11 and a rectifier 44. The normal operating current goes through the transformer 11 and the rectifier 43 and through the pusher switch 34 to the brushes 8*a* of the motor, the pusher switch serving to operate the motor in its positions R, V, and H in the forward, backward, and stop condition. The control lamp 32, of course, shows whether the motor is ready for operation or not.

It can be seen, then, that the present invention provides a means of exposing sensitized paper which is truly portable and only needs a single connection, i.e., to a source of alternating current electricity by means of a flexible cord. The exposure apparatus A can be placed on a pile B of material for operation and does not need to be guided in any way as it passes from one end to the other. It can be operated either manually by hand operation of the reversing switches my means of the push buttons 36 and 39, or this can be done automatically by use of buffer elements striking the same push buttons. The light arrangement is such as to give extremely high intensity of light with a minimum of size of apparatus, yet provision is made so that the apparatus does not overheat.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to be secured by Letters Patent is:

Exposure apparatus for subjecting long sheets of photosensitive material to light radiation, comprising (a) a box-like frame having vertical side walls, a cover, and a floor mounted midway between the top and bottom, (b) a row of light tubes mounted under the floor, the tubes being mounted parallel to one another and at an acute angle to the side walls, (c) an elongated roller mounted in the frame adjacent each of two opposite side walls of the frame, the rollers being mounted for rotation about parallel axes with their lower peripheries extending below the lower edges of the side walls of the frame, each roller extending substantially the entire length of the wall to which it is adjacent, (d) a motor mounted on the floor and connected to one roller for the driving thereof, (e) a ventilating opening in the floor above the tubes, (f) a fan mounted on the floor over the said opening, (g) means providing reflective surfaces on the underside of the floor on either side of the opening, (h) and means including a plurality of reflective strips set at acute angles to the floor to provide reflective surfaces over the opening while permitting the flow of air therethrough.

References Cited by the Examiner

UNITED STATES PATENTS

| | | | |
|---|---|---|---|
| 2,135,480 | 11/1938 | Birdseye. | |
| 2,292,668 | 8/1942 | Sheridan | 95—73 |
| 2,919,635 | 1/1960 | Levine et al. | 95—73 |
| 3,033,095 | 5/1962 | Limberger | 95—77.5 X |
| 3,085,488 | 4/1963 | Heiart | 95—77.5 X |

FOREIGN PATENTS

| | | |
|---|---|---|
| 862,260 | 7/1949 | Germany. |

EVON C. BLUNK, *Primary Examiner.*